US009391991B2

(12) United States Patent
Keeling et al.

(10) Patent No.: US 9,391,991 B2
(45) Date of Patent: *Jul. 12, 2016

(54) MESSAGING GATEWAY FOR DIRECTORY AND ANONYMOUS SERVICES

(71) Applicant: AOL INC., Dulles, VA (US)

(72) Inventors: John Ernest Keeling, Reston, VA (US); Barry Appelman, McLean, VA (US)

(73) Assignee: AOL INC., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,152

(22) Filed: Jun. 27, 2014

(65) Prior Publication Data

US 2014/0310783 A1 Oct. 16, 2014

Related U.S. Application Data

(63) Continuation of application No. 11/226,455, filed on Sep. 15, 2005, now Pat. No. 8,774,381.

(51) Int. Cl.
*H04M 3/42* (2006.01)
*H04L 29/06* (2006.01)
*H04M 1/68* (2006.01)
*H04M 3/436* (2006.01)
(Continued)

(52) U.S. Cl.
CPC .............. *H04L 63/10* (2013.01); *H04L 51/28* (2013.01); *H04M 1/68* (2013.01); *H04M 3/42008* (2013.01); *H04M 3/42382* (2013.01); *H04M 3/4365* (2013.01); *H04M 2203/6009* (2013.01); *H04M 2203/6081* (2013.01)

(58) Field of Classification Search
CPC .................... H04M 2201/40; H04M 2207/18; H04M 3/493; H04M 3/4938

USPC .............................. 379/218.01, 223; 455/414
See application file for complete search history.

(56) References Cited

U.S. PATENT DOCUMENTS 5,031,205 A * 7/1991 Phillips ................. H04M 1/665
379/199
6,353,660 B1 3/2002 Burger et al.
(Continued)

OTHER PUBLICATIONS

"How to Use Skype," Apr. 1, 2005, 6 pgs.
(Continued)

*Primary Examiner* — Solomon Bezuayehu
(74) *Attorney, Agent, or Firm* — Finnegan, Henderson, Farabow, Garrett & Dunner, LLP

(57) ABSTRACT

A subscriber who seeks to block access to contact information may receive identifying information for people attempting to access the subscriber's contact information. The subscriber also may be provided interfaces to enable the attempting person to contact the subscriber, in a variety of escalating forms, without revealing the subscriber's contact information. In a particular implementation, a request is received from an information seeker for contact information for a subscriber. A data structure is accessed that includes an indication that the subscriber should be provided with information relating to requests received for the subscriber's contact information. A message address for the subscriber is accessed, and a message is sent to the subscriber indicating the request for the subscriber's contact information. The requested contact information for the subscriber is withheld from the information seeker absent an indication from the subscriber that the requested contact information may be provided to the information seeker.

18 Claims, 7 Drawing Sheets

(51) Int. Cl.
  *H04L 12/58* (2006.01)
  *H04M 11/10* (2006.01)

(56) References Cited

U.S. PATENT DOCUMENTS

| | | |
|---|---|---|
| 6,665,389 B1 | 12/2003 | Haste, III |
| 6,721,410 B1 | 4/2004 | Will |
| 6,731,733 B2 | 5/2004 | Haran |
| 7,228,335 B2 | 6/2007 | Caughey |
| 7,298,833 B2 | 11/2007 | Klein et al. |
| 7,305,231 B2 | 12/2007 | Strunk |
| 7,333,976 B1 | 2/2008 | Auerbach et al. |
| 7,460,857 B2 | 12/2008 | Roach, Jr. |
| 7,496,351 B2 | 2/2009 | Roach, Jr. |
| 2002/0101446 A1* | 8/2002 | Tang ............... G06Q 10/10 715/751 |
| 2004/0166832 A1* | 8/2004 | Portman ........... G06Q 30/02 455/412.1 |
| 2006/0072726 A1* | 4/2006 | Klein ............... H04M 3/42153 379/201.01 |
| 2006/0166646 A1* | 7/2006 | Roach, Jr. ......... H04L 63/0407 455/411 |

OTHER PUBLICATIONS

"Staying Secure with Skype," Mar. 19, 2005, 3 pgs.
Skype User Guide, "How to Add a Contact," Apr. 1, 2005, 10 pgs.
"Plaxo Product Features," Jun. 21, 2003, 2 pgs.
"Plaxo Your Privacy Choices," Jun. 3, 2004, 6 pgs.
"Plaxo Product Overview," Jun. 2, 2003, 14 pgs.
"How Plaxo Works," Jun. 4, 2013, 12 pgs.
"Welcome to LinkedIn," reprinted from https://www.linkedin.com/ on Sep. 12, 2005, 3 pages.

* cited by examiner

300

| CONTACT INFORMATION | DEFAULT | | INFORMATION SEEKERS | | | | | |
|---|---|---|---|---|---|---|---|---|
| | | | F & F LIST | | F & F TEST | | BLACKBALL LIST | |
| | A | B | A | B | A | B | A | B |
| PHONE NUMBER | UNLISTED | MESSAGE | LISTED | — | LISTED | — | UNLISTED | NO MESSAGE |
| HOME ADDRESS | LISTED | — | LISTED | — | LISTED | — | UNLISTED | NO MESSAGE |
| EMAIL ADDRESS | UNLISTED | NO MESSAGE | LISTED | — | LISTED | — | UNLISTED | NO MESSAGE |

| CONTACT INFORMATION | DEFAULT | | | INFORMATION SEEKERS | | | | | | | | |
|---|---|---|---|---|---|---|---|---|---|---|---|---|
| | | | | F & F LIST | | | F & F TEST | | | BLACKBALL LIST | | |
| | A | B | C | A | B | C | A | B | C | A | B | C |
| PHONE NUMBER | UNLISTED | MESSAGE | NOTIFY | LISTED | — | NO NOTIFICATION | LISTED | — | NOTIFY | UNLISTED | NO MESSAGE | NO NOTIFICATION |
| HOME ADDRESS | LISTED | — | NOTIFY | LISTED | — | NO NOTIFICATION | LISTED | — | NOTIFY | UNLISTED | NO MESSAGE | NO NOTIFICATION |
| EMAIL ADDRESS | UNLISTED | NO MESSAGE | NOTIFY | LISTED | — | NO NOTIFICATION | LISTED | — | NOTIFY | UNLISTED | NO MESSAGE | NO NOTIFICATION |

| 410 | ADDRESS | SUBSCRIBER_IM_ADDRESS |
|---|---|---|
| 420 | REQUIRED INFORMATION | NAME |
| | | PHONE NUMBER |
| | | |
| 430 | OPTIONAL INFORMATION | |

MESSAGING GATEWAY FOR DIRECTORY AND ANONYMOUS SERVICES

CROSS-REFERENCE TO RELATED APPLICATION(S)

This application is a continuation of U.S. patent application Ser. No. 11/226,455, filed on Sep. 15, 2005 (now allowed). The disclosure of the above-referenced parent application is expressly incorporated herein by reference in its entirety.

TECHNICAL FIELD

This disclosure relates to electronic communication services.

BACKGROUND

A person can protect/conceal their telephone number and other contact information, for example, by requesting that their contact information not be listed or otherwise made available by third parties with whom they share the contact information. One example involves a person requesting that their telephone number be treated as an unlisted number by a telephone directory service. Being unlisted prevents all people from accessing, through the directory service at least, the person's contact information. Being unlisted involves a trade-off or cost, therefore, of preventing desired contacts in order also to prevent undesired contacts. Further, the person who requests to have their telephone number unlisted is not provided an indication of who, if anybody, tries to access the person's contact information using the directory service.

Various services provide a person with information on who is calling the person. For example, a person can screen calls using an answering machine, defer calls using voicemail, or even find out (in certain situations) the phone number or calling area of a caller through caller ID. However, in each of these latter situations, the caller has already obtained the person's contact information and could repeatedly contact (or attempt to contact) the person.

SUMMARY

Particular systems disclosed in this application allow a subscriber who seeks to block access to contact information (for example, by being unlisted in a telephone directory service) to receive identifying information for people trying to access the subscriber's contact information. The people trying to access the subscriber's contact information may provide consent for their identifying information to be received by the subscriber. Having gained knowledge of who is attempting to access their contact information, a subscriber is provided interfaces to enable the attempting person to contact them, in a variety of escalating forms, without revealing the subscriber's contact information. These capabilities may be automated and non-intrusive to the subscriber. Thus, rather than isolating the subscriber in order to protect the subscriber's contact information, such systems provide the subscriber with information and with the ability to selectively control access to the subscriber.

According to a general aspect, a request is received from an information seeker for contact information for a subscriber. A data structure is accessed that includes an indication that the subscriber should be provided with information relating to requests received for the subscriber's contact information. A message address for the subscriber is accessed, to which a message may be sent related to the received request for the subscriber's contact information. A message is sent to the subscriber using the message address, the message indicating the request for the subscriber's contact information. The requested contact information for the subscriber is withheld from the information seeker absent an indication from the subscriber that the requested contact information may be provided to the information seeker.

Implementations of the above general aspect may include one or more of the following features. For example, the subscriber may be enabled to respond to the sent message. Enabling the subscriber to respond may include including a response option in the sent message.

A response to the sent message may be received from the subscriber. The response may authorize the information seeker to access the requested contact information, and the information seeker may be provided with the requested contact information. The response may authorize a telephone call to be placed between the information seeker and the subscriber, and the telephone call may be placed between the information seeker and the subscriber while withholding from the information seeker the requested contact information. The response may include a request for additional information from the information seeker, and the additional information may be requested from the information seeker. Receiving the request from the information seeker may include receiving the request during a telephone call, and requesting the additional information from the information seeker may include requesting the additional information during the telephone call. Receiving the request from the information seeker may include receiving the request during a telephone call, and requesting the additional information from the information seeker may include requesting the additional information during a subsequent telephone call.

It may be determined that the subscriber has not pre-authorized release of the requested contact information to the subscriber. The information seeker may be informed that the subscriber has not pre-authorized release of the contact information to the subscriber.

An option may be made available to the information seeker of sending the message to the subscriber informing the subscriber that contact information has been requested. A request may be received from the information seeker to send the message, and sending the message may be performed in response to receiving the request. A non-respondable message may be sent to the subscriber, the non-respondable message indicating the request for the subscriber's contact information without enabling a response by the subscriber.

Knowledge of sending the message to the subscriber may be withheld from the information seeker. Receiving the request may include having a human operator hear the request from the information seeker. Receiving the request may include receiving the request in an automated manner. Accessing the data structure may include accessing the data structure in an automated manner. Accessing the message address may include accessing the message address in an automated manner. Sending the message may include sending the message in an automated manner.

According to another general aspect, an electronic notification is received from an entity, the notification indicating that an information seeker requested a subscriber's contact information. The received notification is presented for the subscriber. A reply to the presented notification is received from the subscriber. The entity is responded to based on the reply.

Implementations of the above general aspect may include one or more of the following features. For example, an option may be presented to the subscriber for replying to the received notification, and receiving the reply from the subscriber may include receiving a reply generated in response to the subscriber's selection of the option. The received notification may be stored, prior to presenting the received notification, until the subscriber connects to a messaging service, and presenting the received notification may include presenting the received notification using the messaging service.

The described aspects may be implemented, for example, as a method, as a computer readable medium including instructions for performing a process, as an apparatus configured to perform a process, and as an apparatus including described features.

Described implementations may have one or more of the following advantages. For example, contact information may be protected by a range of options, allowing particular requesting-entities access to the contact information, preventing other requesting-entities from accessing the contact information, and requiring still other requesting-entities to be screened before access is optionally granted. The range of protection also may be applied differently to different items of contact information. Screening may include providing a message to the contact-information owner, informing the owner of the request for the contact information and allowing the owner to respond. The screening may provide a range of options ranging from making contact information available and making contact information "unlisted," and may provide the contact-information owner with information about the contact-information requesters. The screening also may provide the contact-information owner a mechanism for assembling lists of trusted and untrusted requesters. The screening may be performed while withholding the contact information from the requester. Additionally, a notification may be sent to an entity when that entity's contact information is requested in a directory service, whether or not the request is screened. The notifications, as well as the screenings, may allow the entity to determine who is requesting the entity's contact information, and how many requests are being made for the entity's contact information. Such information may be useful in a variety of applications, including, for example, security, privacy, and marketing applications. As with the screenings, the notifications may be performed while withholding the contact information from the requester.

The details of one or more implementations are set forth in the accompanying drawings and the description below. Other features will be apparent from the description and drawings, and from the claims.

DESCRIPTION OF DRAWINGS

FIG. 3 is a table that describes attributes of contact information and that may be used with the flow of FIG. 2.

FIG. 4 is table that describes information in a message and that may be used with the flow of FIG. 2.

FIG. 6 is a table that describes further attributes of contact information and that may be used in a notification process.

DETAILED DESCRIPTION

In a particular implementation, an unlisted subscriber receives an instant message ("IM") notifying the subscriber when someone is seeking to access the subscriber's unlisted contact information from a telephone directory service. The IM may be limited to a system alert, or it may include content selected by the information seeker (for example, in response to a prompt from the telephone directory service or otherwise) and/or information concerning the information seeker. The subscriber may respond to the IM in a variety of ways. For example, the subscriber may (i) ignore the IM, (ii) block all further IMs from the information seeker, (iii) respond to the IM by requesting the information seeker to indicate the purpose of the call either textually or aurally, (iv) allow a call to be placed without revealing the subscriber's contact information, or (v) allow the subscriber's contact information to be provided to the information seeker.

To receive the IM, an IM bot provides the above functionality, and a directory service operator (live or automated) interfaces between the IM bot and the caller. An information seeker requesting an unlisted number from the directory service is offered an opportunity to have an IM sent to the subscriber on the seeker's behalf. The seeker will typically be charged a fee that may vary depending on the type of information or service that is provided in the IM to the subscriber on the seeker's behalf. The directory service sends the IM to the subscriber's bot, and the subscriber may respond in various ways, such as those listed above.

This implementation provides an inverted approach to the problem of protecting a subscriber's contact information. Rather than simply blocking information from information seekers (the information being the subscriber's contact information) and isolating the subscriber, this implementation provides the subscriber with information on those seeking the subscriber's contact information and allows a subscriber-controlled level of contact between the information seeker and the subscriber.

In several described implementations, the term "notification" typically refers to a message that is not intended to be responded to by a subscriber that receives the notification message. In contrast, the term "message" is typically used, rather than "notification," when a subscriber may possibly respond to the message. This use of the terms "notification" and "message" is for purposes of clarity in presenting specific implementations, and is not intended to limit either term. More generally, the terms "notification" and "message" may be used interchangeably regardless of whether a response to the notification/message is enabled.

Figure 1:
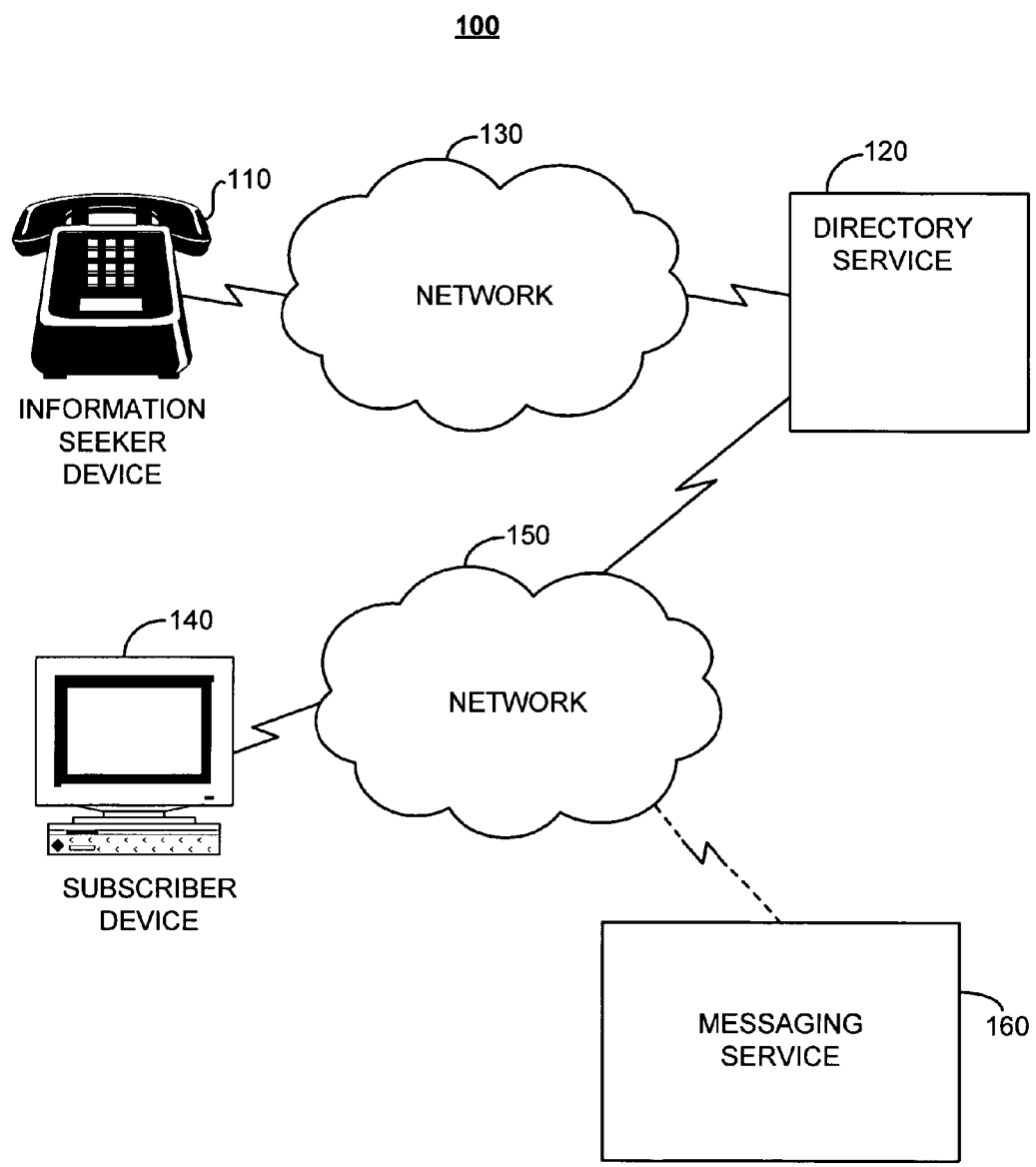
FIG. 1 is a block diagram of one system for requesting contact information.

Referring to FIG. 1, a system 100 may be used by an information seeker to attempt to access contact information for a subscriber to a directory service. System 100 includes an information seeker device 110 communicating with a directory service 120 over a first network 130. Directory service 120 further communicates with a subscriber device 140 over a second network 150. In some implementations, networks 130 and 150 are aspects of a common network.

System 100 also optionally includes a messaging service 160 communicatively coupled to one or more of directory service 120 and subscriber device 140 through network 150. The dashed line connecting messaging service 160 to network 150 indicates the optional status of messaging service 160. Messaging service 160 may include, for example, (1) a telephone distribution center for facilitating sending phone messages from directory service 120 to subscriber device 140, (2) an Internet Service Provider for facilitating sending email messages from directory service 120 to subscriber device 140, and (3) a membership-based communications service such as that provided by America Online, Inc. ("AOL") of Dulles, Va., for facilitating sending IM or electronic mail ("email") messages from directory service 120 to subscriber device 140.

As depicted in FIG. 1, information seeker device 110 may include a telephone, and subscriber device 140 may include a personal computer. In such an implementation, network 130 may include a telephone network, directory service 120 may include a telephone directory service such as "411," and network 150 may include a computer accessible network such as the Internet or the World Wide Web. Implementations also may include multiple subscriber devices 140 and/or multiple information seeker devices 110.

In other implementations, either of information seeker device 110 and subscriber device 140 may include, or be limited to, for example, a computer, a wired telephone, a cell phone, a portable messaging device such as a Blackberry®, and a pager. In such implementations, networks 130 and 150 may vary so as to be compatible with devices 110 and 140, respectively, and may be the same network. Further, in various implementations, directory service 120 may include other information sources, such as, for example, (1) on-line directories or look-up services on the World Wide Web that may provide telephone numbers, addresses, email addresses, or other information for individuals and organizations, (2) search engines that may provide a variety of identifying information for an individual or an organization, and (3) member look-up services that allow members of an organization or group to look-up identifying information for other members.

Figure 2:
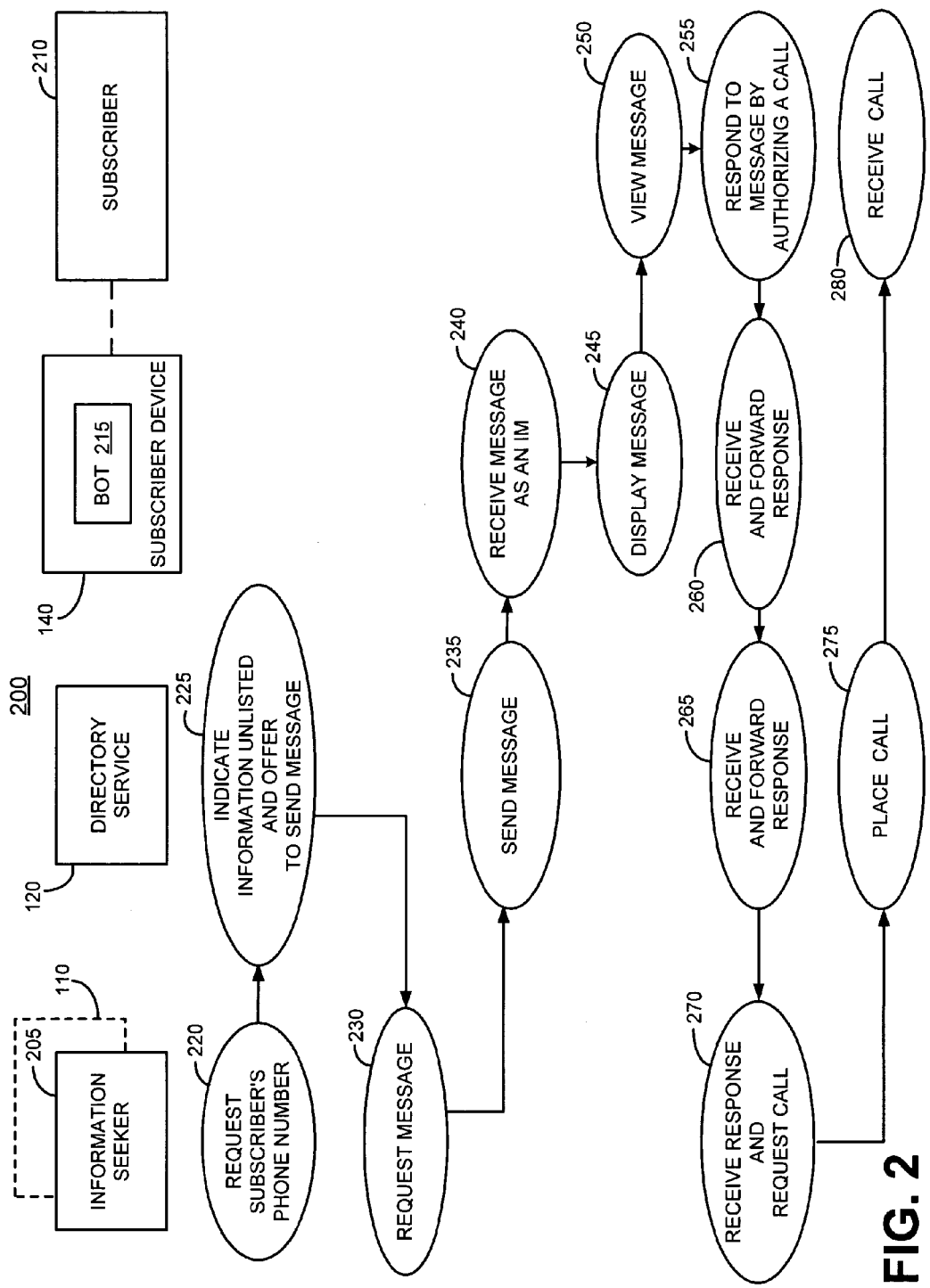
FIG. 2 is a flow diagram of one flow for use with the system of FIG. 1.

Referring to FIG. 2, a flow diagram 200 may be used to illustrate one possible use of system 100. Flow diagram 200 includes operations performed by an information seeker 205, directory service 120, subscriber device 140, and a subscriber 210. Subscriber device 140 may include a bot 215, where "bot" generally refers to an application or intelligent agent. Information seeker 205 uses, for example, information seeker device 110 to perform the indicated operations, as shown by the dashed lines of information seeker device 110 shown behind information seeker 205. Subscriber 210 uses, for example, subscriber device 140, as indicated by the dashed line connecting subscriber 210 and subscriber device 140.

Process 200 includes information seeker 205 requesting subscriber 210's contact information, such as, for example, a telephone number, from directory service 120 (220). Information seeker 205 may be, for example, calling a 411 service over a telephone or searching an on-line service using a computer, in which cases information seeker device 110 may be a telephone or a computer, respectively. Directory service 120, which may include a live operator or may be an automated service, receives the request and determines that directory service 120 has the requested information, but that the requested information is categorized as "unlisted." Directory service 120 further determines that subscriber 210 has indicated a willingness to receive a message (for example, an IM, an email message, a text message, or a voice message) forwarding the request for the information, and allowing subscriber 210 to respond to the request. Accordingly, directory service 120 responds to information seeker 205 by indicating that the requested information is unlisted, but that directory service 120 may send a message to subscriber 210 relaying the request by information seeker 205 (225). Directory service 120 may respond in a manner appropriate to information seeker device 110, such as, for example, by speaking to a telephone or providing a message to a computer.

Referring to FIG. 3, a table 300 may be used by directory service 120 to determine whether requested information is unlisted, and whether subscriber 210 is willing to receive a message forwarding a request for contact information. Table 300 is an example of one implementation, and includes a row for each of three types of contact information 310: a phone number 312, a home address 314, and an email address 316. For each type of contact information 310, table 300 includes entries for information seekers 320 including a default category 322, a friends and family ("F&F") list 324, a friends and family test category 326, and a blackball list 328.

F&F list 324 is a list compiled by subscriber 210 that includes phone numbers of entities who subscriber 210 designates as either friends or family. F&F test category 326 includes all entities that are able to answer a test question correctly. Such a question may be, for example, "What is the maiden name of the mother of subscriber 210?" Blackball list 328 includes phone numbers of entities for which subscriber 210 does not want the entity to receive any contact information for subscriber 210. Blackball list 328 may include known telemarketers or other entities. Default category 322 refers to all entities (information seekers) that do not fall into one of the other categories 324-328. Various categories, particularly F&F test category 326 and blackball list 328 may be dynamic, in that entities may be added to these categories based on, for example, the entity's correctly answering the test question, or subscriber 210 blackballing the entity as explained further below.

Categories 322-328 have been described with respect to a phone number to illustrate an implementation in which information seeker 205 uses a phone to contact directory service 120. In other implementations, information seeker 205 may contact a directory service using another identifier, such as, for example, an instant messaging ("IM") address, an email address, an Internet Protocol ("IP") address, or an account name or screen name in a membership-based service such as that operated by AOL. Accordingly, categories 322-328 may include fields for other identifiers so as to be used in such implementations that are based around the other identifiers. For example, F&F list 324 may include, in addition to the phone numbers of family members, IM addresses, email addresses, IP addresses, and AOL screen names. As another example, blacklist 328 may include email addresses and IP addresses of known spammers.

The entries in each of the categories 322-328 includes a sub-column A for "accessibility" information, and a sub-column B for "screening" information. "Accessibility" information indicates whether the relevant contact information is listed or unlisted, and "screening" information indicates whether subscriber 210 is willing to receive a message forwarding a request for the relevant contact information (also referred to as a screening message).

In flow diagram 200, as described above, directory service 120 indicates that the requested information is unlisted, and that directory service 120 may send a message to subscriber 210 relaying the request from information seeker 205 (225). Directory service 120 may perform operation 225 by (1) determining what information seeker 320 category includes information seeker 205, and (2) accessing the "accessibility" and "screening" information for the row corresponding to phone number 312.

Directory service 120 may determine the category 322-328 of information seeker 205 by determining if information seeker 205 is on F&F list 324 or blackball list 328, and, if not, posing the test question to information seeker 205 to see whether information seeker 205 qualifies for the F&F test category 326. If information seeker 205 does not answer the test question correctly, then (4) information seeker 205 is grouped with default category 322.

Assuming that information seeker 205 is in default category 322, directory service 120 then may determine whether the requested phone number is listed or unlisted. To do so, directory service 120 accesses the entry at the intersection of the row corresponding to phone number 312 and sub-column A of default category 322, which states "unlisted." Because the requested phone number is unlisted, directory service 120 may then determine whether subscriber 120 is willing to receive a message forwarding the request for the phone number. To do so, directory service 120 accesses the entry at the intersection of the row corresponding to phone number 312 and sub-column B of default category 322, which states "message." The entry of "message" indicates that subscriber 120 is willing to receive a message, whereas an entry of "no message" indicates that subscriber 120 is not willing to receive a message. An entry of "-" indicates that no message is needed because the relevant contact information is listed.

Table 300 reveals, for example, that when information seekers in default category 322 request the email address of subscriber 210, the email address will not be provided and no message will be sent to subscriber 210. Default category 322 information seekers, therefore, have no access to the email address of subscriber 210. Such a result may reflect a decision by subscriber 210 that such information requesters are usually spammers and, if not, such information requesters can access the home address of subscriber 210 or request the phone number.

Referring again to FIG. 2, information seeker 205 receives the information from directory service 120 indicating that the requested phone number is unlisted and that a message can be sent to subscriber 210. In response, information seeker 205 requests that the offered message be sent to subscriber 210 (230), and directory service 120 sends the message (235).

Referring to FIG. 4, a table 400 may be used by directory service 120 in composing and sending the message to subscriber 210. Table 400 includes a subscriber address 410, a list of required information 420, and a list of optional information 430. In many implementations, table 400 may parallel the format of the message to be sent. Address 410 includes an IM address for subscriber 210, although other implementations may use other addressing schemes such as those described above. An IM address may be used, for example, for the immediacy with which a message can be sent to subscriber 210 and responded to by subscriber 210. Other forms of communication have their own advantages. What information is to be included on the list of required information 420 may be determined by the subscriber 210 or directory service 120. Commonly, a name and phone number of any information seeker would be required, as shown in FIG. 4. Similarly, subscriber 210 or directory service 120 also may determine what information is to be included on the list of optional information 430.

Directory service 120 may already have the information required on list 420, or allowed on list 430, or may have to query (not shown) information seeker 205 to get the information. In any event, directory service 120 may inform information seeker 205 of the information that is to be included in the message, and obtain the approval of information seeker 205 for that information to be provided to subscriber 210. Directory service 120 may, thus, vary the amount of information that is included in the message based on the approval of information seeker 205.

Various implementations require information seeker 205 to pay for the message to be sent. In such implementations, directory service 120 may vary the amount of information that is included in the message based on a level of service paid for by information seeker 205. Implementations may allow information seeker 205 to include, perhaps for a fee, a personalized message describing, for example, the purpose of seeking the phone number of subscriber 210. The amount of information that is included in the message also may vary based on, for example, (1) the message type (for example, an IM, an email message, or a text message), with IMs and email messages possibly allowing attachments (2) the bandwidth of a communications line, with high-bandwidth lines allowing, for example, video messages and various attachments including video attachments, and (3) the type of subscriber device 140, with video-capable devices, for example, allowing video messages/attachments, and non-mobile devices being more likely to allow attachments.

In offering to send a message (225), directory service 120 may provide a variety of guarantees to information seeker 205. For example, directory service 120 may agree to provide to information seeker 205 (1) merely a guarantee of sending the message, (2) a guarantee of delivering the message, or (3) a copy of a read receipt if subscriber 210 reads or otherwise views the message. In some implementations, the directory service 120 may provide no such guarantees. In implementations in which the on-line status of subscriber 210 is available, directory service also may indicate to information seeker 205 that subscriber 210 is, for example, currently logged-in to an IM service.

Additionally, the message that is sent to subscriber 210 (235) may ask for, or enable, a variety of options. For example, the message may enable subscriber 210 to authorize release of the phone number, or to authorize a call to be placed through directory service 120 without releasing the phone number to information seeker 205.

Figure 5:
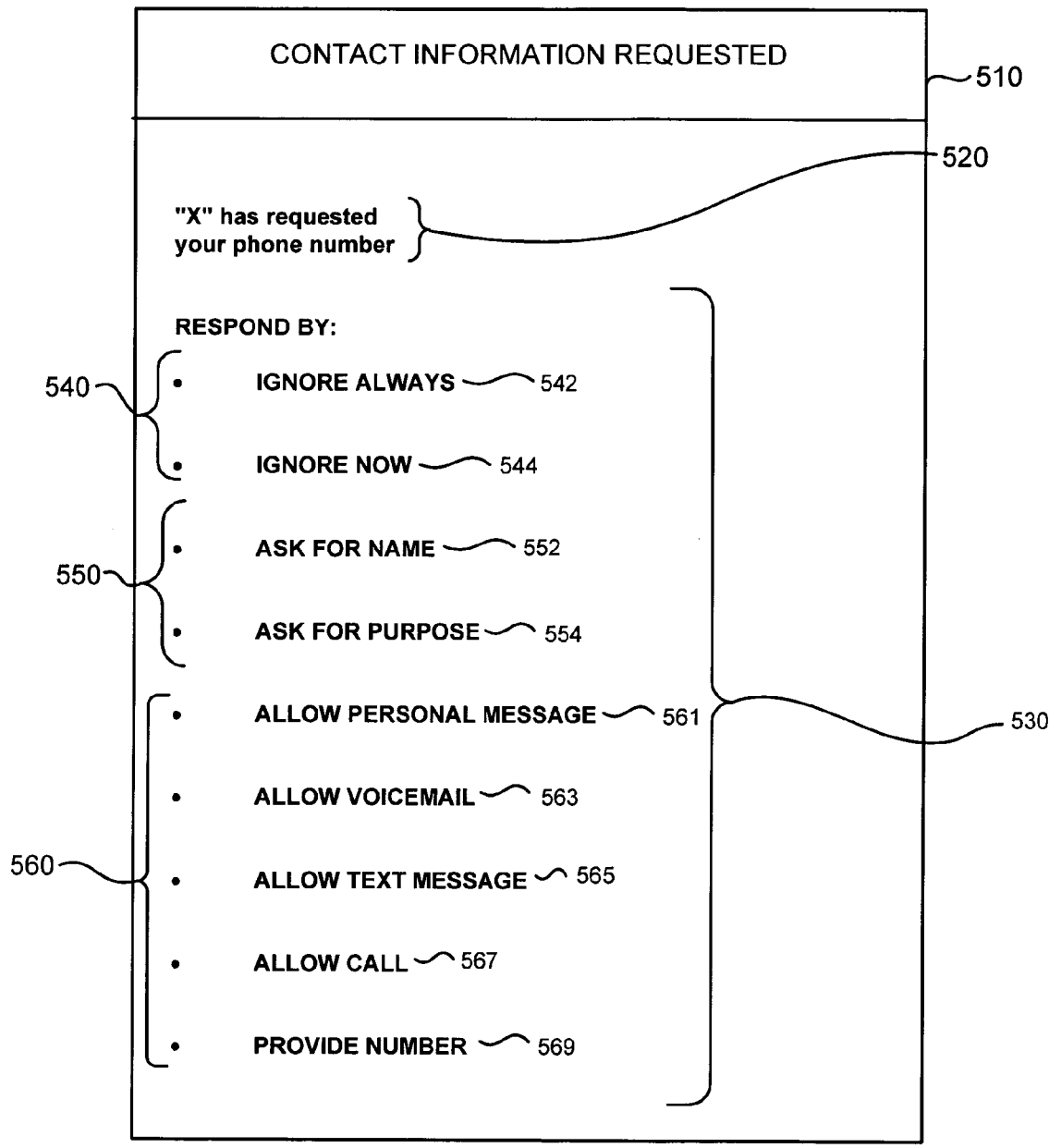
FIG. 5 is a format for a message that may be used with the flow of FIG. 2.

Referring to FIG. 5, directory service 120 may send a message (235) such as, for example, a message 500. Message 500 is an IM, although the information could be sent in another form, such as an email message, a text message, or a voice message. Message 500 includes a header section 510 indicating to subscriber 210 that contact information has been requested, an identifier section 520 indicating the identity (for example, name and/or phone number) of information seeker 205, and a response section 530 listing various available responses.

Response section 530 includes two options 540 allowing subscriber 210 to decline the request from information seeker 205 for information. An option 542 allows subscriber 210 to decline the request and to add information seeker 205 to blackball list 328. An option 544 allows subscriber 210 to decline the request without adding information seeker 205 to blackball list 328.

Response section 530 also includes two options 550 allowing subscriber 210 to ask for specific items of information from information seeker 205. An option 552 allows subscriber 210 to ask for the name of information seeker 205, and option 554 allows subscriber 210 to ask the purpose for which information seeker 205 wants the phone number of subscriber 210. One or both of these specific items of information may be included as required or optional information in the message, in which case these particular response options need not be activated.

Response section 530 also includes five options 560 allowing subscriber 210 to enable information seeker 205 to respond in a manner that is less-constrained than in options 550. An option 561 authorizes information seeker 205 to send a personal message via IM. An option 563 authorizes information seeker 205 to send a voice message via IM, or perhaps via the phone number without revealing the phone number to information seeker 205. An option 565 authorizes information seeker 205 to send a text message via the phone number without revealing the phone number to information seeker 205. An option 567 authorizes directory service 120 to place a call connecting information seeker 205 and subscriber 210 without revealing the phone number to information seeker 205. Finally, an option 569 authorizes directory service 120 to provide to information seeker 205 the requested phone number.

Referring again to FIG. 2, after directory service 120 sends the message (235), subscriber device 140 receives the message as an IM (240). As discussed above, subscriber device 140 may include bot 215 to process the received IM. Assuming that subscriber 210 is logged-in to the IM facility, bot 215 displays the IM on subscriber device 140 for subscriber 210 (245). If subscriber 210 is not logged-in, bot 215 may save the IM for later display or may discard the IM. Once displayed, subscriber 210 views the IM (250) and responds to the IM by selecting option 567 to authorize a call (255).

Bot 215 receives the response from subscriber 210 and forwards the response to directory service 120 (260). Directory service 120 then receives the response and forwards the response to information seeker 205 (265). If the response from subscriber 210 is received in real-time, then directory service 120 may present the response to information seeker 205 while information seeker 205 waits for the response. In such cases, directory service 120 may, for example, use text-to-speech to speak the response in an automated manner over a telephone connection, have a live human operator read the response over a telephone connection, or forward the response over an open computer connection to a browser operated by information seeker 205.

If the response from subscriber 210 is not received in real-time, however, directory service 120 may initiate contact with information seeker 205 in a variety of ways to forward the response. Such ways may include, for example, sending an email message or placing a telephone call. Directory service 120 may use, for example, a time-out counter to determine how long to wait for a response from subscriber 210. Delays may be introduced for various reasons, such as, for example, (1) subscriber 210 not being logged-in to an IM facility when information seeker 205 requests that the message be sent (230), in which case directory service 120 may hold the message, (2) subscriber 210 not being logged-in to an IM facility when the message is received (240), (3) subscriber 210 not reading the IM immediately (250), and (4) subscriber 210 not responding to the IM immediately upon viewing (255). In non-real-time implementations, the response may include an identifier associating the response with subscriber 210 and information seeker 205 so that the response can be verified.

Information seeker 205 receives the response from subscriber 210 that is forwarded by directory service 120, and requests the call that was authorized by subscriber 210 in the response (270). Directory service 120 receives the call request and places the call (275) without revealing to information seeker 205 the phone number of subscriber 210. Subscriber 210 then receives the call (280). The call will typically be placed to the phone number stored for subscriber 210, which may represent, for example, a standard phone number or a number for contacting subscriber 210 using a voice-over-IP ("VoIP") connection. Accordingly, the call may be placed, for example, over a VoIP connection through subscriber device 140, with subscriber device 140 including a speaker and a microphone, or over a standard telephone connection to a phone used by subscriber 210.

Although not shown in flow diagram 200, implementations may include multiple rounds of communication between subscriber 210 and information seeker 205 before subscriber 210 either refuses or grants the request. For example, rather than authorizing a call in operation 255, subscriber 210 may select option 554 in message 500 to request that information seeker 205 indicate the purpose of the phone number request. Information seeker 205 may then respond to the request in operation 270 by stating that information seeker 205 is a referral from a good customer of subscriber 210. Directory service 120 and subscriber device 140 may relay this response in a message similar to message 500, and subscriber 210 may then select option 567 to authorize the call.

In addition to, or in lieu of, providing the above-described messaging features, implementations may provide a notification feature to subscriber 210 whenever contact information for subscriber 210 is requested from directory service 120. Notifications may be sent in real-time, or in a batch at predetermined intervals. Notifications may be provided for any and all requests, or may be tailored, as shown, for example, in FIG. 6.

Referring to FIG. 6, a table 600 includes all of the information of table 300, and adds a sub-column C for each category 322-328 of information seekers 320. Sub-column C of each category 322-328 indicates whether a notification is to be sent to subscriber 210 when the indicated contact information is requested by an information seeker 230 of the particular category 322-328. For example, continuing with the example from the discussion of FIG. 2 above, information seeker 205 belongs to default category 322 and requests the phone number of subscriber 210. Accordingly, directory service 120 determines that a notification is to be sent to subscriber 210 by consulting the entry at the intersection of sub-column C under default category 322 and the row for phone number 312. The entry "notify" indicates that a notification is to be sent. Conversely, an entry of "no notification" indicates that no notification is to be sent.

Table 600 reveals that subscriber 210 does not receive notifications when either listed family and friends (category 324) or blackballed entities (category 328) request contact information. Subscriber 210 may have made such a distinction because subscriber 210 was not interested in knowing when family members or telemarketers were trying to access contact information of subscriber 210. Table 600 also reveals that subscriber 210 is notified when listed information is requested by information seekers in default category 322 or information seekers that have answered the test question correctly (category 326). It should be clear from Table 600 that subscriber 210 receives both notifications and, possibly; messages, when the unlisted phone number is requested by information seekers in the default category 322. Other implementations may merge the messaging/screening and notification features by, for example, providing notifications in real-time and allowing a subscriber to respond to notifications.

The notifications may be made with, or without, the permission of information seeker 205. Notifications can be sent by a live directory service operator, or by an automated directory service operator. Further, even for directory services that use a live operator, the notifications can be handled by a back-end system in an automated manner without the involvement or knowledge of the live operator.

As with the messages discussed earlier, the notifications may be sent in a variety of different formats. Examples include IMs, email messages, text messages, voice messages, spreadsheets, and databases. Again, as with the messages discussed earlier, notifications may be sent to a bot, such as bot 215 of subscriber device 140, or more generally may be sent to a subscriber device.

Figure 7:
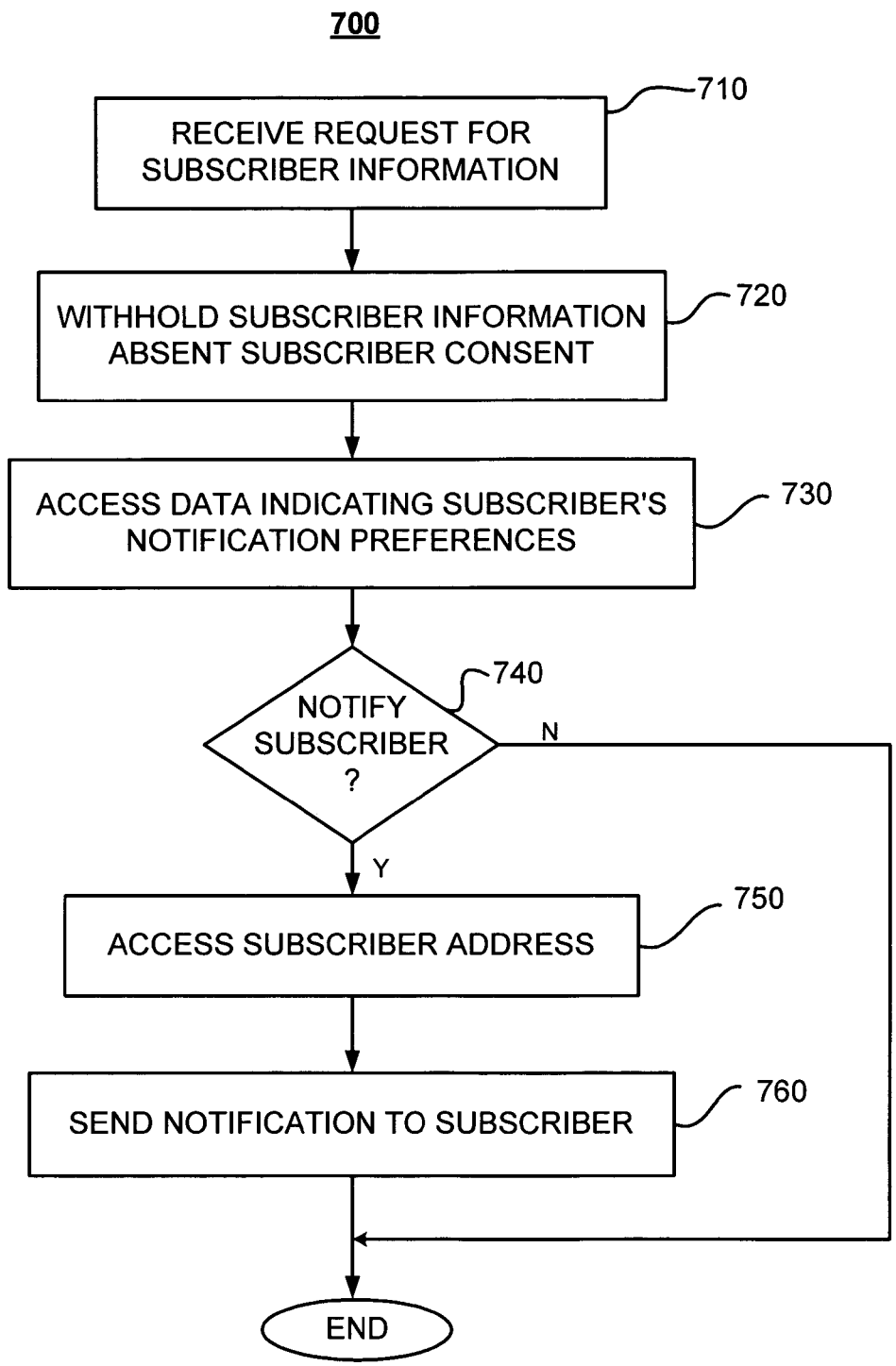
FIG. 7 is a flow chart of one process for providing notification that contact information has been requested.

Referring to FIG. 7, a process 700 may be used for sending notifications. Process 700 may be performed, for example, by directory service 120.

Process 700 includes receiving a request for a subscriber's contact information (710), such as, for example, receiving the request sent in operation 220 of flow diagram 200. Process 700 includes withholding the requested contact information of the subscriber absent the subscriber's consent (720). Such consent may be provided, for example, by an entry in table 300 or table 600 indicating that the requested contact information is "listed" for the requesting information seeker. Such consent also may be provided, for example, by the subscriber selecting option 569 in message 500 in operation 255 of flow diagram 200.

Process 700 includes accessing data indicating the subscriber's notification preferences (730), such as, for example, by accessing entries in a sub-column C of table 600. Process 700 then determines whether to notify the subscriber, based on the accessed data (740), such as, for example, by determining whether the accessed data is "notify" or "no notification."

If the subscriber is to be notified ("yes" branch from operation 740), then the subscriber's address is accessed (750), and the notification is sent to the subscriber (760). The subscriber's address may be accessed, for example, by accessing address 410 in table 400. The notification may be sent, for example, in a manner analogous to the sending of the message in operation 235 of flow diagram 200. After sending the notification (760), or if the subscriber is not to be notified ("no" branch from operation 740), process 700 ends.

Figure 8:
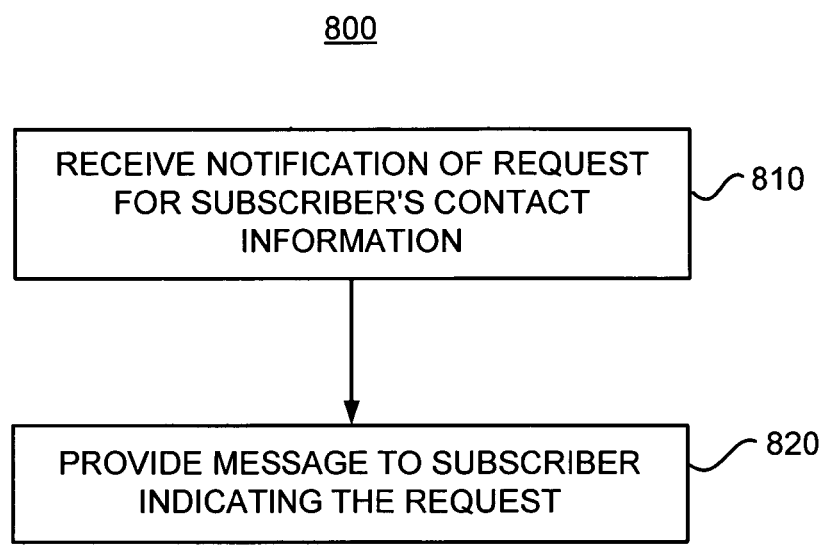
FIG. 8 is a flow chart of one process for providing a message regarding the notification provided by the process of FIG. 7.

Referring to FIG. 8, a process 800 may be used for receiving notifications. Process 800 may be performed, for example, by subscriber device 140, or more specifically by bot 215. Process 800 includes receiving a notification of a request for a subscriber's contact information (810). A notification may have been sent as described in operation 760 of process 700, and may be received, for example, in a manner analogous to bot 215 receiving a message in operation 240 of flow diagram 200. Process 800 then includes providing a message to the subscriber indicating the request for the subscriber's contact information (820). A message may be provided to the subscriber in a manner analogous to displaying the message in operation 245 of flow diagram 200.

Subscriber device 140 and information seeker device 110 may include, for example, a mainframe computer, a personal computer, a personal digital assistant ("PDA"), a phone, a messaging device, and a game device. Subscriber device 140 and information seeker device 110 may include a storage device that may be, for example, volatile or non-volatile, and may include, for example, a hard disk, a flash memory, a read-only memory, a random access memory, and a compact diskette. The storage device also may be part of a processor or other component of subscriber device 140 or information seeker device 110.

Implementations may include one or more devices configured to perform one or more processes. A device may include, for example, discrete or integrated hardware, firmware, and software. Implementations also may be embodied in a device, such as a storage device described above, that includes one or more computer readable media having instructions for carrying out one or more processes. The computer readable media may include, for example, the actual storage element (for example, magnetic media of a disk, or the encoded media of an optically-readable compact diskette) of a storage device, and formatted electromagnetic waves encoding or transmitting instructions. Instructions may be, for example, in hardware, firmware, software, and in an electromagnetic wave. A processor may be, for example, both a device configured to carry out a process, and a device including computer readable media having instructions for carrying out a process.

A number of implementations have been described. Nevertheless, it will be understood that various modifications may be made. For example, elements of one or more implementations described above may be combined, deleted, modified, or supplemented to form further implementations. Accordingly, other implementations are within the scope of the following claims.

What is claimed is:

1. A computer-implemented method, the method comprising the following operations performed by one or more processors:
   receiving, over one or more communication networks, a request from a device of an information seeker for contact information of a subscriber to enable communication over a first communication medium;
   identifying, based on preferences for the subscriber stored in a storage device, an indication that the requested contact information not be revealed unless the subscriber provides an express authorization;
   sending, in response to identifying the indication that express authorization is needed, an electronic message to a device of the subscriber over the one or more communication networks;
   enabling, through selection of one or more options displayed on a user interface of the subscriber's device, the subscriber to request and receive information from the information seeker;
   receiving, over the one or more communication networks, the requested information from the device of the information seeker; and
   enabling, through the user interface, the subscriber to provide the express authorization to contact the subscriber over a second communication medium.

2. The method of claim 1, wherein the operations further comprise:
   accessing, at an online directory service, a data structure including an indication that the subscriber be provided with information relating to requests for contact information.

3. The method of claim 1, wherein the operations further comprise:
   enabling the subscriber to designate a category associated with the information seeker who requests contact information; and
   enabling the subscriber to make the indication that the requested contact information not be revealed based on the requested contact information and the designated category associated with the information seeker.

4. The method of claim 1, wherein the operations further comprise:
   sending the electronic message to the subscriber indicating the request for contact information.

5. The method of claim 4, wherein the operations further comprise:
   enabling the subscriber to respond to the message to request information;
   receiving the requested information; and
   providing the requested information to the subscriber.

6. The method of claim 1, wherein the operations further comprise:

receiving the request for contact information during a telephone call; and requesting the requested information during a subsequent telephone call.

7. The method of claim 1, wherein receiving the request for contact information includes:

receiving a telephone request at a telephone directory service; and receiving an Internet-based request at an Internet-based directory service.

8. The method of claim 1, wherein the operations further comprise:

providing the requested contact information.

9. The method of claim 8, wherein:

receiving the request for contact information includes receiving the request in an automated manner; and providing the requested contact information includes providing the requested contact information in an automated manner.

10. An apparatus for controlling access to contact information of a subscriber, comprising:

a storage device that stores a set of instructions; and at least one processor coupled to the storage device, the at least one processor being operative with the set of instructions in order to:

receive, over one or more communication networks, a request from a device of an information seeker for contact information of the subscriber to enable communication over a first communication medium;

identify, based on preferences for the subscriber stored in a storage device, an indication that the requested contact information not be revealed unless the subscriber provides an express authorization;

send, in response to identifying the indication that express authorization is needed, an electronic message to a device of the subscriber over the one or more communication networks;

enable, through selection of one or more options displayed on a user interface of the subscribers device, the subscriber to request and receive information from the information seeker;

receiving, over the one or more communication networks, the requested information from the device of the information seeker; and enable, through the user interface, the subscriber to provide the express authorization to contact the subscriber over a second communication medium.

11. The apparatus of claim 10, wherein the at least one processor is further operative with the set of instructions to access, at an online directory service, a data structure including an indication that the subscriber be provided with information relating to requests for contact information.

12. The apparatus of claim 10, wherein the at least one processor is further operative with the set of instructions to:

enable the subscriber to designate a category associated with the information seeker who requests contact information; and enable the subscriber to make the indication that the requested contact information not be revealed based on the requested contact information and the designated category associated with the information seeker.

13. The apparatus of claim 10, wherein the at least one processor is further operative with the set of instructions to send a message to the subscriber, the message indicating the request for contact information.

14. The apparatus of claim 13, wherein the at least one processor is further operative with the set of instructions to:

enable the subscriber to respond to the message to request information;

receive the requested information; and provide the requested information to the subscriber.

15. The apparatus of claim 10, wherein the at least one processor is further operative with the set of instructions to:

receive the request for contact information during a telephone call; and request the requested information during a subsequent telephone call.

16. The apparatus of claim 10, wherein the at least one processor is further operative with the set of instructions to receive the request for contact information by:

receiving a telephone request at a telephone directory service; and receiving an Internet-based request at an Internet-based directory service.

17. The apparatus of claim 10, wherein the at least one processor is further operative with the set of instructions to provide the requested contact information.

18. A tangible, non-transitory computer-readable medium that stores a set of instructions that, when executed by at least one processor, cause the at least one processor to:

receive, over one or more communication networks, a request from a device of an information seeker for contact information of a subscriber to enable communication over a first communication medium;

identify, based on preferences for the subscriber stored in a storage device, an indication that the requested contact information not be revealed unless the subscriber provides an express authorization;

send, in response to identifying the indication that express authorization is needed, an electronic message to a device of the subscriber over the one or more communication networks;

enable, through selection of one or more options displayed on a user interface of the subscriber's device, the subscriber to request and receive information from the information seeker;

receiving, over the one or ore communication networks, the requested information from the device of the information seeker; and enable, through the user interface, the subscriber to provide the express authorization to contact the subscriber over a second communication medium.

* * * * *